United States Patent [19]
Dierke

[11] Patent Number: 5,920,833
[45] Date of Patent: *Jul. 6, 1999

[54] AUDIO DECODER EMPLOYING METHOD AND APPARATUS FOR SOFT-MUTING A COMPRESSED AUDIO SIGNAL

[75] Inventor: Gregg Dierke, San Jose, Calif.

[73] Assignee: LSI Logic Corporation, Milpitas, Calif.

[*] Notice: This patent is subject to a terminal disclaimer.

[21] Appl. No.: 08/594,283

[22] Filed: Jan. 30, 1996

[51] Int. Cl.⁶ .................................................... G10L 9/00
[52] U.S. Cl. ......................... 704/230; 704/229; 704/222; 704/500
[58] Field of Search .................. 395/2.92, 2.31, 395/2.09, 2.42, 2.39; 704/500, 501, 502, 503, 222, 200, 233, 230, 229

[56] References Cited

U.S. PATENT DOCUMENTS

| | | | |
|---|---|---|---|
| Re. 32,278 | 11/1986 | Yokota et al. | 307/130 |
| 4,211,997 | 7/1980 | Rudnick et al. | 371/38 |
| 4,283,793 | 8/1981 | Numata | 455/213 |
| 4,420,694 | 12/1983 | Yokota et al. | 370/130 |
| 4,525,867 | 7/1985 | Shiratani | 455/194.1 |
| 4,811,370 | 3/1989 | Yamada et al. | 377/54 |
| 5,063,597 | 11/1991 | Seo et al. | 395/2.35 |
| 5,103,315 | 4/1992 | Kufta et al. | 348/638 |
| 5,151,942 | 9/1992 | Sasaki | 381/94.5 |
| 5,204,973 | 4/1993 | Sugayama | 455/212 |
| 5,390,344 | 2/1995 | Nagata | 455/220 |
| 5,392,037 | 2/1995 | Kato | 341/67 |
| 5,424,678 | 6/1995 | Heyl et al. | 330/51 |
| 5,450,248 | 9/1995 | Van Eijck et al. | 360/32 |
| 5,467,139 | 11/1995 | Lankford | 348/512 |
| 5,568,200 | 10/1996 | Pearlstein et al. | 348/426 |
| 5,598,506 | 1/1997 | Wilgren et al. | 395/2.42 |
| 5,644,310 | 7/1997 | Laczko et al. | 341/143 |
| 5,649,029 | 7/1997 | Galbi | 382/233 |
| 5,657,423 | 8/1997 | Benbassat et al. | 395/2.39 |

*Primary Examiner*—Richemond Dorvil

[57] ABSTRACT

An MPEG audio decoder includes a Vector FIFO buffer and a windowed polyphase filter. Groups of vector samples are zeroed out prior to storage in the Vector FIFO buffer when it is desired to soft-mute an audio output of the decoder.

27 Claims, 2 Drawing Sheets

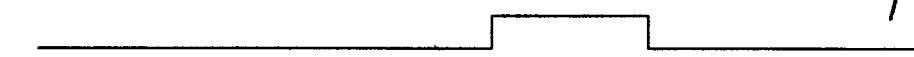
FIG. 1a
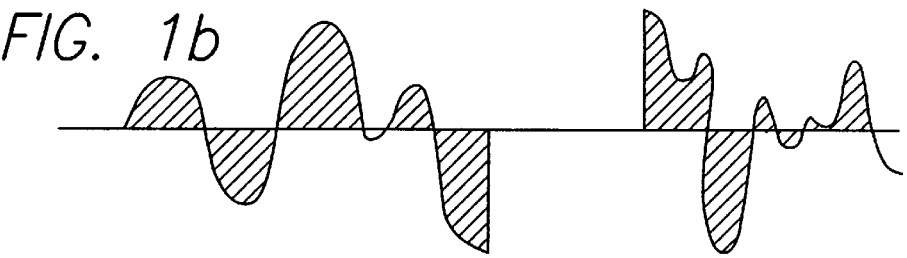
FIG. 1b
FIG. 1c
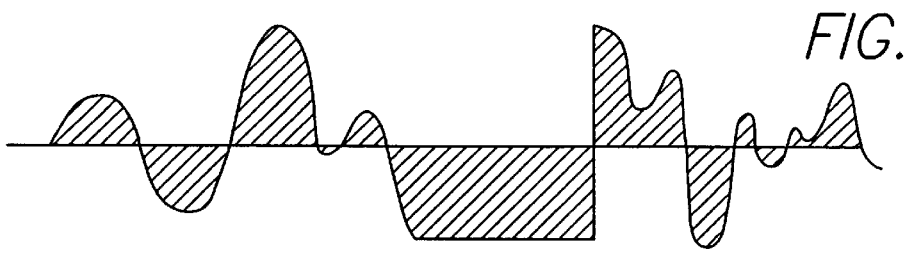
FIG. 1d
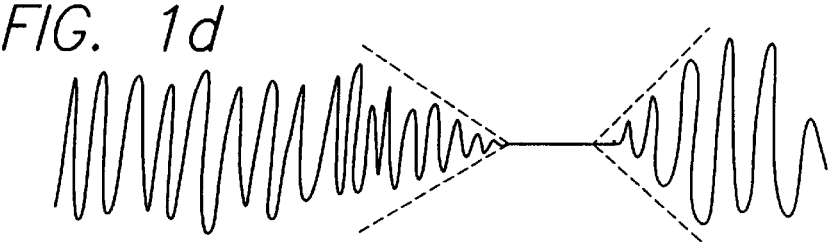
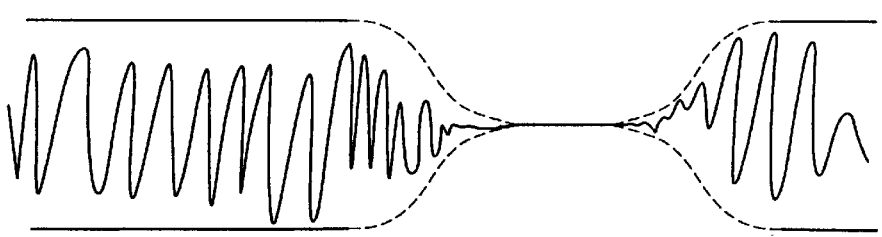
FIG. 4
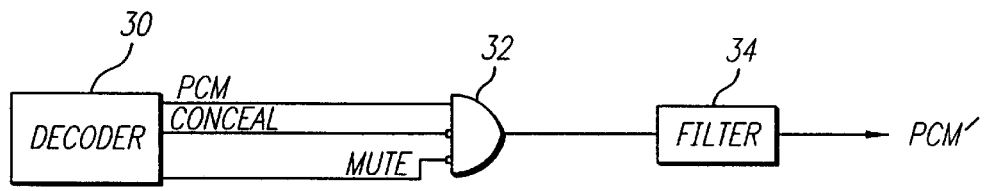
FIG. 6

AUDIO DECODER EMPLOYING METHOD AND APPARATUS FOR SOFT-MUTING A COMPRESSED AUDIO SIGNAL

BACKGROUND OF THE INVENTION

The invention relates to electronic audio signal systems and devices. The invention also relates to digital communications.

Data compression is extremely important to the music industry. In digital audio signal systems, digital samples of sound are stored on a Compact Disk Read Only Memory (CD ROM). Fidelity of the sound is proportional to the rate at which the sounds are sampled (the sampling rate) and the number of bits comprising each sample. An audio signal sampled 22,000 times per second (22 kHz) by a 16-bit analog-to-digital converter (ADC) is of far higher fidelity than an audio signal sampled at 11 kHz by an 8-bit ADC. An audio signal sampled at 44 kHz by a 24-bit ADC is of even higher fidelity. However, the 44 kHz, 24 bit sampling produces three times as much data as the 22 kHz, 16-bit sampling and twelve times as much data as the 11 kHz, 8-bit sampling. This is where data compression is so important. The data compression reduces the amount of data stored on the CD ROM, but maintains the fidelity of the sound. Data compression allows an audio signal sampled at 44 kHz by a 24-bit ADC to be stored economically on a CD ROM.

Data compression is also important to the television industry, especially with the emergence of direct broadcast television. In a direct broadcast system, digital signals of near-perfect video images and audio waveforms are encoded according to a known standard, transmitted to a satellite orbiting the earth, and relayed by the satellite on the Ku band to any home equipped with a small dish antenna and a receiver unit. Data compression reduces the amount of video and audio data that must be transmitted.

One compression standard becoming widely used is the MPEG standard. MPEG was established by the Moving Pictures Experts Group of the International Standardization Organization to specify a format for the encoding of compressed full-motion video and audio. MPEG audio compression produces CD quality audio at very high compression rates.

When playing any digitally-encoded source, such as a CD player, it sometimes becomes desirable to mute the audio output. One technique known as "hard-muting" is performed by abruptly terminating the audio output. A Mute signal is generated and AND'ed with the audio output (see FIGS. 1a and 1b). The hard mute is akin to pulling the plug on the CD player. The problem with this technique is that it causes a discontinuity in the audio output (in FIG. 1b, the discontinuity appears as a square edge of the audio waveform). The discontinuity produces a very audible and very loud and undesirable "thump" that is potentially damaging to human ears and speaker woofers. In addition, the discontinuity produces very high-amplitude, high frequencies (ringing) that can damage the speaker's tweeters. The problem is repeated when the hard-mute is released. The audio signal is abruptly resumed, and another discontinuity is created.

A second technique for muting the audio output is performed by freezing and repeating the last sample on the audio output (see FIG. 1c). This technique avoids the abrupt termination of the audio output and, therefore, the first discontinuity. However, when the mute is released, the audio output is abruptly resumed, and a discontinuity is created. Thump!

A more sophisticated (third) muting technique uses scale factors to perform a quick fade on the audio output (see FIG. 1d). Prior to output, an audio signal is multiplied by a scale factor ranging between 0 (no volume) and 1 (normal volume). By ramping the scale factor between 1 to 0, the audio signal is scaled down and up without discontinuities. This technique is similar to quickly turning the volume down and up. Because there are no discontinuities, this technique is more pleasing to the ear and less damaging to the speakers. One disadvantage of this technique, however, is the need for additional hardware for generating the scale factors and multiplying the audio signal with the scale factors. Another disadvantage is the difficulty of concealing or limiting errors encountered when corrupted data read from the CD ROM is decoded by the CD player. Such corrupted data creates an error factor that propagates to the audio output. The third technique does not ramp down the audio output both slowly enough to avoid ringing and quickly enough to remove from the audio output errors caused by the improperly coded vectors. In fact, erroneous data will always sneak through and most likely be audible, regardless of the rate at which the scale factor is ramped.

SUMMARY OF THE INVENTION

The present invention avoids the discontinuities of the first two techniques and the disadvantages of the third technique. According to a broad aspect of the present invention, a method of processing an encoded audio signal comprises the steps of decoding the encoded signal into vector samples; replacing those vector samples decoded during an event with neutral data; buffering the decoded vector samples; and filtering the decoded vector samples to generate digital samples. The event can be a soft-mute.

According to another broad aspect of the present invention, an audio core module comprises a vector FIFO; a windowed polyphase filter having an input coupled to an output of the vector FIFO; and at least one gate. When a soft-mute is commanded, the at least one gate replaces data to be stored in the Vector FIFO buffer with neutral data such as zeroes.

An MPEG audio decoder comprises an audio host module; an audio output; and the audio core module according to the present invention. The audio core module is coupled between the audio host module and the audio output. The audio host module generates a Mute signal when the soft-mute is commanded, and the audio core module replaces the data stored in the Vector FIFO buffer with the neutral data in response to the Mute signal.

BRIEF DESCRIPTION OF THE DRAWINGS

FIG. 1a is a depiction of a Mute signal, and FIGS. 1b, 1c and 1d are depictions of audio output waveforms resulting from the three prior art muting techniques above;

FIG. 4 is a depiction of an audio output waveform resulting from the muting technique according to the present invention;

FIG. 6 is a block diagram of an alternative embodiment of an audio decoder according to the present invention.

DETAILED DESCRIPTION OF THE PREFERRED EMBODIMENTS

The present invention will be described below in connection with a digital audio signal that is encoded according to the MPEG specification. To facilitate a better understanding of the present invention, the MPEG specification will first be described briefly. Then the present invention will be described.

The MPEG audio specification describes three different coding algorithms: Layer I, Layer II and Layer III. The three different algorithms are provided for coding efficiency. Layer I is the least complex, but provides the lowest compression. Layer III is the most complex, but provides the highest compression. Layer II is intermediate the two both in complexity and compression.

The audio signal is sampled and coded according to one of the algorithms. Groups of thirty two audio samples are transformed from the time domain to the frequency domain by a Discrete Cosine Transform (DCT). The resulting group of thirty two DCT vectors forms a subframe. Twelve subframes (384 vectors overall) are grouped into a Layer I audio frame, 36 subframes (1152 vectors overall) are grouped into a Layer II audio frame, and 36 subframes (1152 vectors overall) are grouped into a Layer III audio frame.

Each subframe of thirty two vectors is scaled by thirty two scale factors and quantized by an allocation. The scale factor is a six bit code that is used to reference a 26-bit value in a lookup table. The same scale factors are applied to each subframe in an audio frame. The allocation is a code that indicates how many bits are used to encode the DCT vector. The variable-length DCT vectors are stored as fractional numbers.

In addition to the subframes, each audio frame includes a header, a cyclical redundancy check (CRC) code (optional), the allocation, and the scale factor. The header includes a synchronization code, the layer, bit rate, sampling frequency and CRC error detection enabled. If enabled, the CRC code provides error detection for certain portions of the audio frame.

Figure 2:
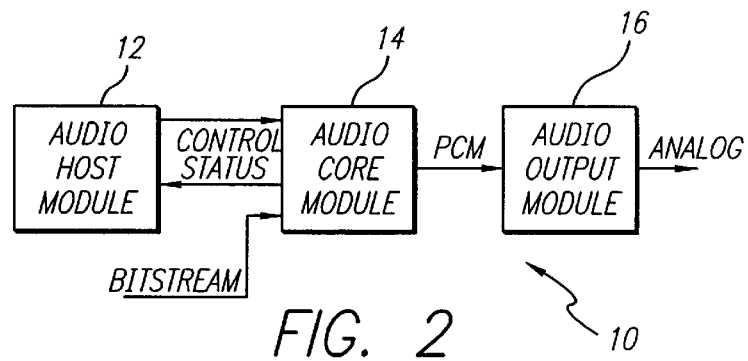
FIG. 2 is a block diagram of an audio decoder according to the present invention.

Reference is now made to FIG. 2, which shows an audio decoder 10 according to the present invention. The audio decoder 10 includes an audio host module 12, an audio core module 14 and an audio output module 16. The audio host module 12 provides an interface between the outside world and the audio core module 14. It generates control signals for the audio core module 14. The control signals include Start, Stop, Pause, Fast, Slow and Mute. The audio host module 12 receives status information such as error flags from the audio core module 14.

The audio core module 14 receives an incoming audio signal (i.e., bitstream) and converts the bitstream into digital PCM samples. The PCM samples are sent to the audio output module 16 over a parallel link. The audio output module 16 converts the PCM samples to a serial format understood by digital-to-analog converters (DACs) which, in turn, converts to analog. The analog signal is supplied over a serial link to an amplifier or speakers. The audio output module 16 paces the audio core module 14, requesting the PCM samples when needed to reproduce the analog signal.

Figure 3:
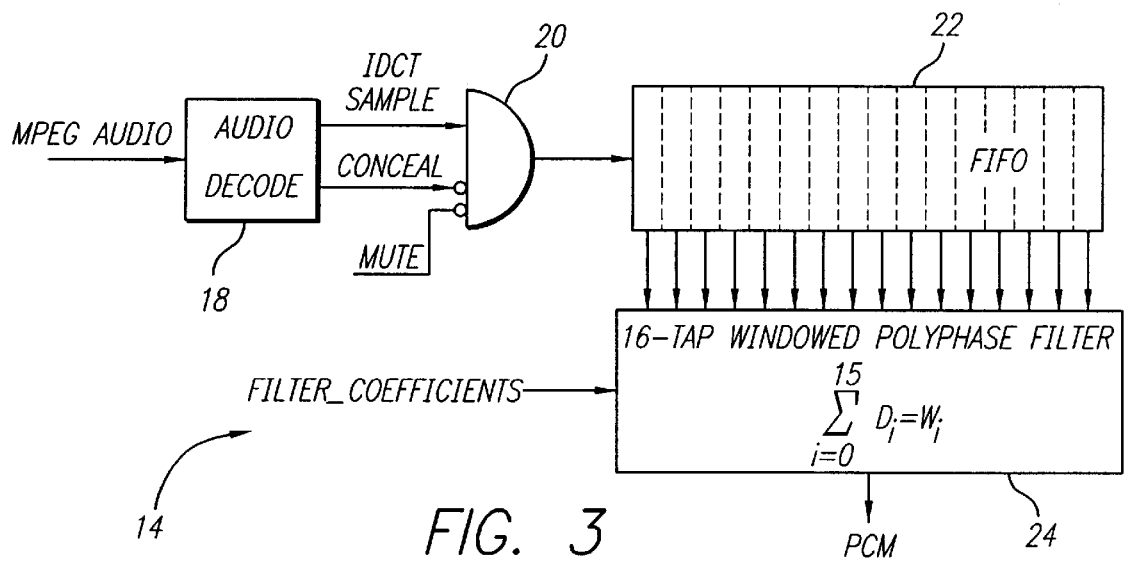
FIG. 3 is a block diagram of an audio core module, which forms a part of the audio decoder shown in FIG. 2.

FIG. 3 shows the audio core module 14. A decode unit 18 parses out the subframes from the bitstream, dequantizes the DCT vectors in the subframes, rescales the dequantized DCT vectors, and transforms the dequantized, rescaled DCT vectors from the frequency domain to the time domain using an Inverse Discrete Cosine Transform (IDCT). The decode unit 18 outputs IDCT vector samples in groups, with each group comprising thirty two IDCT vector samples per channel (normally, there are two channels).

Each group of IDCT vector samples is buffered along with fifteen previous groups. During certain events, however, the vector samples are replaced with neutral data before they are buffered. The neutral data is preferably zeros. From a system perspective, it's as though the vectors were simply encoded with all zeroes. Of course, the neutral data could be of any value or patterns of values that produce the desired effect.

The IDCT vector samples are "zeroed out" when a CONCEAL signal goes high. The CONCEAL signal goes high whenever it is desirable to conceal a vector. Reasons for concealing a vector might include a decode error (e.g., illegal bit combinations), a transmission error (a CRC error is detected), a reconstruction error (a frame cannot be reconstructed due to buffer underflow) or any syntax error indicated by one of the error flags. The CONCEAL signal is generated by the audio host module 12 or the audio core module 14. If the CONCEAL signal is not available from either module 12 or 14, however, it can be generated by a state machine. The CONCEAL signal is inverted and AND'ed together with the vector(s) to be concealed by an AND gate 20.

The IDCT vector samples are also "zeroed out" when a MUTE signal goes high. The MUTE signal, which indicates that the audio should be muted, is inverted and supplied to another input of the AND gate 20. The MUTE signal is generated by the audio host module 12.

The IDCT vector samples are stored in groups in a vector buffer 22. The buffer 22 is preferably a Vector First-In-First-Out (FIFO) buffer. The buffer 22 can be implemented by a Random Access Memory (RAM).

The IDCT vector samples are read out of the buffer 22 in groups and supplied to a windowed polyphase filter 24, which "blends" the IDCT vector samples together into PCM samples. IDCT vector samples that have been "zeroed out" are blended with the other IDCT vector samples. The amount and rate of blending depends upon the width of the filterbank and the profiles of its coefficients (or "Q") relative to the pulse width of the CONCEAL and MUTE signals.

The filterbank of a filter for an MPEG decoder happens to be fixed by the MPEG specification at sixteen windows (which makes sixteen vector groups the optimal size for the buffer 22). Sixteen windows for thirty two IDCT vector samples per window requires 512 coefficients for the filter 24 to generate the PCM samples. However, in the broader sense, the filter 24 is not limited to only the MPEG specification and could have windows of different numbers and sizes, as needed.

The MUTE signal has a relatively long pulse width, typically lasting for many frames. When the MUTE signal goes high, the first window of the filter 24 is filled with zeroes, but the remaining windows are still loaded with IDCT vector samples that have not been zeroed out. Therefore, the MUTE signal does not abruptly cut off the output of the filter 24. Only when all of the windows are loaded with zeroed out IDCT vector samples does the filter finally provide a zero PCM output, as the zeroed-out samples are spread out over time. As a result, the filter 24 provides a tapering so faint as to be inaudible (see FIG. 4). Similarly, when MUTE signal is released, the PCM output smoothly ramps back up. In general, a larger filter width will cause a longer tapering. Conversely, a narrow filter width will not spread out the zeroed out samples. The filter width specified by the MPEG specification allows the filter 24 to provide a "soft-mute" that is much more pleasing to the ear than any of the prior art techniques described above and that does not harm speakers or headphones.

Figure 5A:
FIGS. 5a and 5b are depictions of a CONCEAL signal and an audio output waveform resulting from an error concealment technique according to the present invention.
Figure 5B:
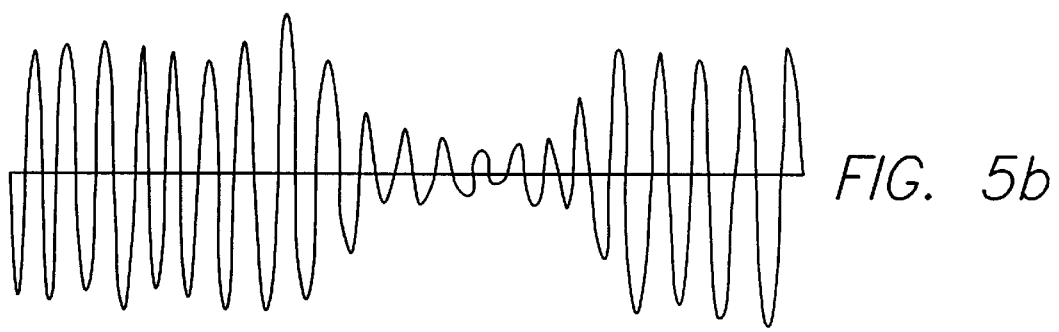

The CONCEAL signal, on the other hand, has a short pulse width, lasting for typically just a single frame (see FIG. 5a). For an effective concealment, the filter width should be roughly equal to or preferably greater than one audio frame. For example, the nature of the filterbank and its coefficients specified by the MPEG specification causes the audio output to be effectively muted for considerably less than one frame-time (FIG. 5b). In fact, the 384 vectors of the Layer I frame are less than the 512 samples processed by the filter, which means that the audio output is never completely muted (−20 dB) in the case of a single frame error. In a Layer II frame, the PCM output is fully muted for only 640 vectors (~15 ms), instead of the full 1152 vectors.

The operations performed by the audio block 18, AND gate 20, buffer 22 and filter 24 can be implemented on separate chips or on a single chip. The operations performed by the audio block 18, AND gate 20, buffer 22 and filter 24 can be realized by hardware elements such as multipliers and adders, or they can be realized by a microprocessor or digital signal processor and appropriate software. Moreover, the IDCT vector samples need not be zeroed out by an AND gate 20; any logic implementation (e.g. NOR) will do.

Thus disclosed is an audio decoder that performs a soft-mute and error concealment at the chip level. Such an implementation is both desirable and convenient because muting and error concealment are tightly coupled to the decoding process. Advantage is taken of the windowed filter already in place for MPEG audio decoding. Unlike the ramped scale factor technique, very little additional hardware is required.

The soft mute is much more pleasing to the ear than the "hard-mute" and other prior art muting techniques. Because it avoids discontinuities in the audio signal, the soft-mute does not harm speakers or headphones.

FIG. 6 shows an audio decoder 30 that does not employ a windowed polyphase filter. PCM samples provided on an output of the decoder 30 are softened by the use of an AND gate 32 and a windowed polyphase filter 34. Inputs of the AND gate 32 are supplied with the PCM samples, an inverted CONCEAL signal and an inverted MUTE signal, and an output of the AND gate 32 is coupled to an input of the windowed polyphase filter 34. An output of the filter 34 provides the softened PCM samples. The CONCEAL signal can be supplied by the audio decoder 30 or by a separate state machine (not shown) and the MUTE signal is provided by the audio encoder 30.

It is understood that various changes and modifications may be made without departing from the spirit and scope of the invention. For example, the audio decoder shown in FIG. 2 can be an MPEG audio decoder, an MPEG-2 audio decoder, or any other type of audio decoder employing a filter that spreads out the vector samples to provide a PCM output.

The invention is not limited to any particular type of system. It could be applied to any systems that require audio decoders, such as Direct Broadcast Systems, Cable TV systems, Compact Disk systems and even the anticipated Digital Versatile Disk (DVD) systems. Thus, the present invention is not limited to the precise embodiment described hereinabove. Various modifications can be made without departing from the spirit and scope of the invention as defined by the claims that follow.

I claim:

1. A method of processing an encoded audio signal, comprising the steps of:

decoding the encoded signal into vector samples;

replacing those vector samples decoded when a soft-mute is commanded with neutral data;

after said replacing step, buffering the decoded vector samples; and filtering the decoded vector samples to generate PCM samples.

2. The method of claim 1, wherein the event is an audio mute, whereby an analog audio signal reconstructed from the digital samples is soft-muted during the audio mute.

3. The method of claim 1, wherein the encoded signal includes normalized DCT samples, and wherein the encoded signal is decoded by the steps including:

dequantizing the DCT samples;

resealing the dequantized DCT samples; and transforming the rescaled DCT samples to IDCT vector samples.

4. The method of claim 1, wherein the vector samples are replaced by zeroing out the vector samples.

5. The method of claim 4, wherein the vector samples are zeroed out by the steps including:

generating a pulse having a width that coincides with the occurrence of the event; and performing at least one logic operation with the pulse and the vector samples.

6. The method of claim 5, wherein the logic operation is performed by:

inverting the pulse; and

AND'ing the pulse with the vector samples.

7. The method of claim 1, wherein the vector samples are buffered in groups on a first-in, first out basis.

8. The method of claim 7, wherein the buffered vector samples are filtered by spreading out the buffered vector samples.

9. The method of claim 7, wherein the buffered vector samples are filtered by performing the steps of:

storing each group of buffered vector samples in a window, whereby the groups are stored in separate windows;

forming products of the windowed vector samples and filter coefficients; and summing the products together.

10. The method of claim 1, further comprising the step of reconstructing an analog audio signal from contiguous digital samples.

11. A method of generating an analog audio signal in response to an MPEG-encoded signal, comprising the steps of:

processing the MPEG-encoded audio signals into IDCT vector samples;

replacing the vector samples with neutral data when a soft-mute is commanded:

after said replacing step, buffering the IDCT vector samples in groups on a first-in, first-out basis; and reconstructing the audio signal from an output of the filter.

12. The method of claim 11, wherein the IDCT vector samples are replaced by zeroing out the IDCT vector samples.

13. An audio core module, comprising:

a vector FIFO;

a windowed polyphase filter having an input coupled to an output of the vector FIFO; and at least one gate for replacing data for the Vector FIFO buffer with neutral data when a soft-mute is commanded.

14. The audio core module of claim 13, wherein an output of the at least one gate is coupled to an input of the vector FIFO, the at least one gate replacing data supplied to the input of the Vector FIFO with neutral data when a soft-mute is commanded.

15. The audio core module of claim 14, wherein the at least one gate zeroes out the data provided to the input of the Vector FIFO buffer when the soft-mute is commanded.

16. The audio core module of claim 14, wherein a Mute signal is generated when the soft-mute is commanded; and wherein the at least one gate outputs zeroed out data in response to the Mute signal and the data provided to the input of Vector FIFO buffer.

17. The audio core module of claim 16, wherein the Mute signal is a pulse, and wherein the at least one gate includes an inverter for inverting the pulse an AND gate for AND'ing together the pulse and the data provided to the input of Vector FIFO buffer.

18. The audio core module of claim 13, wherein the FIFO, the filter and the at least one gate are on a single chip.

19. An MPEG audio decoder, comprising:
an audio host module;
an audio output; and
the audio core module of claim 13, the audio core module being coupled between the audio host module and the audio output, the audio host module generating a Mute signal when the soft-mute is commanded, the audio core module replacing the data stored in the Vector FIFO buffer with the neutral data in response to the Mute signal.

20. An audio core module comprising:
means for decoding an encoded signal;
means, responsive to the decoding means, for zeroing out the decoded signal when a soft mute is commanded;
means for buffering an output of the zeroing-out means; and
means for filtering an output of the buffering means to produce samples that can be reconstructed into an analog audio signal.

21. The audio core module of claim 20, wherein the decoding means, the zeroing-out means, the buffering means, and the filtering means are on a single chip.

22. An audio decoder comprising:
the audio core module of claim 20;
an audio host module for generating a Mute signal when the soft mute is commanded, the audio core module zeroing out the decoded signal in response to the Mute signal; and
an audio output module for reconstructing an analog audio signal from the samples produced by the filtering means.

23. An audio decoder comprising:
an audio core module;
an audio host module coupled to the audio core module;
an audio output module coupled to the audio core module;
at least one gate for zeroing out an output of the audio output module during a soft-mute; and
a filter for spreading out an output of the at least one gate, the filter providing digital samples that can be reconstructed into an analog audio signal.

24. A method of performing a soft-mute in an audio encoder, the method comprising the steps of:
parsing an input bit stream to obtain Discrete Cosine Transform (DCT) vector samples;
dequantizing, rescaling, and transforming the DCT vector samples to form Inverse Discrete Cosine Transform (IDCT) vector samples;
concealing decoding errors by replacing the IDCT vector samples with neutral data by AND'ing the neutral data with the IDCT vector samples;
buffering the IDCT vector samples, after replacing the IDCT vector samples with neutral data, using a Vector FIFO buffer; and
blending the IDCT vector samples using a windowed polyphase filter to form digital samples.

25. The method of claim 24, wherein the IDCT vector samples are replaced by being zeroed out.

26. The method of claim 25, wherein the IDCT vector samples are zeroed out by the steps of:
generating a pulse; and
performing at least one logic operation with the pulse and the IDCT vector samples.

27. The method of claim 26, wherein the logic operation is performed by:
inverting the pulse; and
AND'ing the pulse with the IDCT vector samples.

* * * * *